United States Patent
Kommula

(10) Patent No.: US 7,657,629 B1
(45) Date of Patent: Feb. 2, 2010

(54) GLOBAL SERVER LOAD BALANCING

(75) Inventor: Sunanda L. Kommula, San Jose, CA (US)

(73) Assignee: Foundry Networks, Inc., Santa Clara, CA (US)

( * ) Notice: Subject to any disclaimer, the term of this patent is extended or adjusted under 35 U.S.C. 154(b) by 575 days.

(21) Appl. No.: 10/376,903

(22) Filed: Feb. 28, 2003

Related U.S. Application Data

(63) Continuation-in-part of application No. 10/206,580, filed on Jul. 25, 2002, now Pat. No. 7,254,626, which is a continuation-in-part of application No. 09/670,487, filed on Sep. 26, 2000, now Pat. No. 7,454,500.

(51) Int. Cl.
*G06F 15/173* (2006.01)

(52) U.S. Cl. .................................... 709/226

(58) Field of Classification Search ......... 709/223–224, 709/226–228, 241, 201, 203
See application file for complete search history.

(56) References Cited

U.S. PATENT DOCUMENTS

| | | | | |
|---|---|---|---|---|
| 5,031,094 | A | 7/1991 | Toegel et al. | 364/200 |
| 5,359,593 | A | 10/1994 | Derby et al. | 370/17 |
| 5,948,061 | A | 9/1999 | Merriman et al. | 709/219 |
| 5,951,634 | A * | 9/1999 | Sitbon et al. | 718/105 |
| 6,006,269 | A | 12/1999 | Phaal | |
| 6,006,333 | A | 12/1999 | Nielsen | |
| 6,092,178 | A | 7/2000 | Jindal et al. | 712/27 |
| 6,112,239 | A | 8/2000 | Kenner et al. | 709/224 |
| 6,115,752 | A | 9/2000 | Chauhan | 709/241 |
| 6,119,143 | A | 9/2000 | Dias et al. | |
| 6,128,279 | A | 10/2000 | O'Neil et al. | 370/229 |
| 6,128,642 | A * | 10/2000 | Doraswamy et al. | 709/201 |
| 6,148,410 | A | 11/2000 | Baskey et al. | |
| 6,167,445 | A | 12/2000 | Gai et al. | |
| 6,167,446 | A | 12/2000 | Lister et al. | 709/223 |
| 6,182,139 | B1 | 1/2001 | Brendel | |
| 6,195,691 | B1 | 2/2001 | Brown | |
| 6,233,604 | B1 | 5/2001 | Van Horne et al. | 709/203 |
| 6,286,039 | B1 | 9/2001 | Van Horne et al. | 709/221 |
| 6,286,047 | B1 | 9/2001 | Ramanathan et al. | 709/224 |

(Continued)

OTHER PUBLICATIONS

Albitz, P., et al., "DNS and BIND in a Nutshell," O'Reilly & Associates, Sebastopol, CA, 1992, pp. 214-215.

(Continued)

*Primary Examiner*—Salad Abdullahi
(74) *Attorney, Agent, or Firm*—Schwabe, Williamson & Wyatt, P.C.

(57) ABSTRACT

A global server load-balancing (GSLB) switch serves as a proxy to an authoritative DNS and communicates with numerous site switches that are coupled to host servers serving specific applications. The GSLB switch receives from site switches operational information regarding host servers within the site switches neighborhood. When a client program requests a resolution of a host name, the GSLB switch, acting as a proxy of an authoritative DNS, returns one or more ordered IP addresses for the host name. The IP addresses are ordered using metrics that include the information collected from the site switches or based on other metric information. Examples of metrics include weighted site, weighted IP, and active bindings metrics. The GSLB switch places the address that is deemed "best" at the top of the list.

30 Claims, 5 Drawing Sheets

U.S. PATENT DOCUMENTS

| | | | |
|---|---|---|---|
| 6,304,913 B1 | 10/2001 | Rune | |
| 6,324,580 B1 | 11/2001 | Jindal et al. | 709/228 |
| 6,327,622 B1 | 12/2001 | Jindal et al. | |
| 6,336,137 B1 | 1/2002 | Lee et al. | |
| 6,381,627 B1 | 4/2002 | Kwan et al. | 709/201 |
| 6,389,462 B1 | 5/2002 | Cohen et al. | 709/218 |
| 6,393,473 B1 | 5/2002 | Chu | |
| 6,405,252 B1 | 6/2002 | Gupta et al. | |
| 6,427,170 B1 | 7/2002 | Sitaraman et al. | 709/226 |
| 6,434,118 B1 | 8/2002 | Kirschenbaum | |
| 6,438,652 B1 | 8/2002 | Jordan et al. | 711/120 |
| 6,446,121 B1 | 9/2002 | Shah et al. | |
| 6,449,657 B2 | 9/2002 | Stanbach, Jr. et al. | 709/245 |
| 6,470,389 B1 | 10/2002 | Chung et al. | 709/227 |
| 6,473,802 B2 | 10/2002 | Masters | |
| 6,480,508 B1 | 11/2002 | Mwikalo et al. | 370/475 |
| 6,487,555 B1 * | 11/2002 | Bharat et al. | 707/10 |
| 6,490,624 B1 | 12/2002 | Sampson et al. | |
| 6,549,944 B1 | 4/2003 | Weinberg et al. | 709/224 |
| 6,578,066 B1 * | 6/2003 | Logan et al. | 718/105 |
| 6,578,077 B1 | 6/2003 | Rakoshitz et al. | |
| 6,606,643 B1 | 8/2003 | Emens et al. | 709/203 |
| 6,611,861 B1 | 8/2003 | Schairer et al. | |
| 6,665,702 B1 | 12/2003 | Zisapel et al. | |
| 6,681,232 B1 | 1/2004 | Sistanizadeh et al. | 707/104.1 |
| 6,681,323 B1 | 1/2004 | Fontanesi et al. | 713/1 |
| 6,691,165 B1 | 2/2004 | Bruck et al. | |
| 6,725,253 B1 | 4/2004 | Okano et al. | |
| 6,745,241 B1 | 6/2004 | French et al. | |
| 6,754,699 B2 | 6/2004 | Swildens et al. | |
| 6,760,775 B1 | 7/2004 | Anerousis | |
| 6,772,211 B2 | 8/2004 | Lu et al. | |
| 6,779,017 B1 | 8/2004 | Lamberton et al. | |
| 6,789,125 B1 | 9/2004 | Aviani et al. | 709/238 |
| 6,826,198 B2 | 11/2004 | Turina et al. | |
| 6,839,700 B2 | 1/2005 | Doyle et al. | |
| 6,850,984 B1 | 2/2005 | Kalkunte et al. | |
| 6,874,152 B2 | 3/2005 | Vermeire et al. | |
| 6,879,995 B1 | 4/2005 | Chinta et al. | |
| 6,898,633 B1 | 5/2005 | Lyndersay et al. | 709/226 |
| 6,901,081 B1 | 5/2005 | Ludwig | |
| 6,928,485 B1 | 8/2005 | Krishnamurthy et al. | |
| 6,963,914 B1 * | 11/2005 | Breitbart et al. | 709/226 |
| 6,963,917 B1 | 11/2005 | Callis et al. | 709/227 |
| 6,985,956 B2 | 1/2006 | Luke et al. | |
| 6,987,763 B2 | 1/2006 | Rochberger et al. | 370/389 |
| 6,996,615 B1 | 2/2006 | McGuire | |
| 6,996,616 B1 | 2/2006 | Leighton et al. | |
| 7,000,007 B1 | 2/2006 | Valenti | 709/219 |
| 7,020,698 B2 | 3/2006 | Andrews et al. | 709/223 |
| 7,020,714 B2 | 3/2006 | Kalyanaraman et al. | |
| 7,028,083 B2 | 4/2006 | Levine et al. | |
| 7,032,010 B1 | 4/2006 | Swildens et al. | 709/219 |
| 7,032,031 B2 | 4/2006 | Jungck et al. | |
| 7,036,039 B2 | 4/2006 | Holland | |
| 7,058,717 B2 | 6/2006 | Chao et al. | |
| 7,062,642 B1 | 6/2006 | Langrind et al. | |
| 7,082,102 B1 | 7/2006 | Wright | |
| 7,086,061 B1 | 8/2006 | Joshi et al. | 718/105 |
| 7,089,293 B2 | 8/2006 | Grosner et al. | |
| 7,114,008 B2 | 9/2006 | Jungck et al. | |
| 7,127,713 B2 | 10/2006 | Davis et al. | |
| 7,136,932 B1 | 11/2006 | Schneider | |
| 7,139,242 B2 | 11/2006 | Bays | |
| 7,177,933 B2 | 2/2007 | Foth | |
| 7,185,052 B2 | 2/2007 | Day | |
| 7,197,547 B1 | 3/2007 | Miller et al. | |
| 7,206,806 B2 | 4/2007 | Pineau | |
| 7,225,272 B2 | 5/2007 | Kelley et al. | |
| 7,240,015 B1 | 7/2007 | Karmouch et al. | |
| 7,240,100 B1 | 7/2007 | Wein et al. | |
| 7,254,626 B1 | 8/2007 | Kommula et al. | |
| 7,257,642 B1 | 8/2007 | Bridger et al. | |
| 7,260,645 B2 | 8/2007 | Bays | |
| 7,277,954 B1 | 10/2007 | Stewart et al. | |
| 7,296,088 B1 | 11/2007 | Padmanabhan et al. | |
| 7,321,926 B1 | 1/2008 | Zhang et al. | |
| 7,330,908 B2 | 2/2008 | Jungck | |
| 7,383,288 B2 | 6/2008 | Miloushev et al. | |
| 7,423,977 B1 | 9/2008 | Joshi et al. | |
| 7,454,500 B1 | 11/2008 | Hsu et al. | |
| 7,496,651 B1 | 2/2009 | Joshi | |
| 2001/0049741 A1 | 12/2001 | Skene et al. | |
| 2001/0052016 A1 * | 12/2001 | Skene et al. | 709/226 |
| 2002/0026551 A1 | 2/2002 | Kamimaki et al. | 710/260 |
| 2002/0038360 A1 | 3/2002 | Andrews et al. | |
| 2002/0055939 A1 | 5/2002 | Nardone et al. | |
| 2002/0059170 A1 | 5/2002 | Vange | |
| 2002/0059464 A1 | 5/2002 | Hata et al. | |
| 2002/0062372 A1 | 5/2002 | Hong et al. | 709/225 |
| 2002/0078233 A1 | 6/2002 | Biliris et al. | 709/238 |
| 2002/0087722 A1 | 7/2002 | Datta et al. | |
| 2002/0091840 A1 | 7/2002 | Pulier et al. | 709/228 |
| 2002/0112036 A1 | 8/2002 | Bohannon et al. | 709/220 |
| 2002/0120743 A1 | 8/2002 | Shabtay et al. | 709/226 |
| 2002/0120763 A1 | 8/2002 | Miloushev et al. | |
| 2002/0124096 A1 | 9/2002 | Loguinov et al. | |
| 2002/0133601 A1 | 9/2002 | Kennamer et al. | |
| 2002/0150048 A1 | 10/2002 | Ha et al. | |
| 2002/0154600 A1 | 10/2002 | Ido et al. | |
| 2002/0188862 A1 | 12/2002 | Trethewey et al. | 713/201 |
| 2002/0194324 A1 | 12/2002 | Guha | |
| 2002/0194335 A1 | 12/2002 | Maynard | 709/225 |
| 2003/0018796 A1 | 1/2003 | Chou et al. | |
| 2003/0031185 A1 | 2/2003 | Kikuchi et al. | |
| 2003/0035430 A1 | 2/2003 | Islam et al. | |
| 2003/0065711 A1 | 4/2003 | Acharya et al. | 709/203 |
| 2003/0065763 A1 | 4/2003 | Swildens et al. | 709/224 |
| 2003/0105797 A1 | 6/2003 | Dolev et al. | 709/105 |
| 2003/0115283 A1 | 6/2003 | Barbir et al. | |
| 2003/0135509 A1 | 7/2003 | Davis et al. | 707/100 |
| 2003/0154239 A1 | 8/2003 | Davis et al. | |
| 2003/0210686 A1 | 11/2003 | Terrell et al. | 370/389 |
| 2003/0210694 A1 | 11/2003 | Jayaraman et al. | 370/392 |
| 2003/0229697 A1 | 12/2003 | Borella | |
| 2004/0019680 A1 | 1/2004 | Chao et al. | |
| 2004/0024872 A1 | 2/2004 | Kelley et al. | 709/225 |
| 2004/0039847 A1 | 2/2004 | Persson et al. | |
| 2004/0064577 A1 | 4/2004 | Dahlin et al. | |
| 2004/0194102 A1 | 9/2004 | Neerdaels | |
| 2004/0249939 A1 | 12/2004 | Amini et al. | |
| 2004/0249971 A1 | 12/2004 | Klinker | |
| 2005/0021883 A1 | 1/2005 | Shishizuka et al. | 710/20 |
| 2005/0033858 A1 | 2/2005 | Swildens et al. | 709/232 |
| 2005/0086295 A1 | 4/2005 | Cunningham et al. | 709/203 |
| 2005/0149531 A1 | 7/2005 | Srivastava | 707/10 |
| 2005/0169180 A1 | 8/2005 | Ludwig | |
| 2005/0286416 A1 | 12/2005 | Shimonishi et al. | |
| 2006/0020715 A1 | 1/2006 | Jungck | |
| 2006/0036743 A1 | 2/2006 | Deng et al. | |
| 2007/0168547 A1 | 7/2007 | Krywaniuk | |

OTHER PUBLICATIONS

Alteon Systems, "Alteon WebSystems Introduces New Layer 4+ Switching Technology that Speeds User Access to Internet Servers," Dec. 7, 1998, retrieved Nov. 5, 2002, from http://web.archive.org/web/20000919190409/www.alteonwebsystems.com/press/releases/1998/120798.asp, pp. 1-4.

Alteon WebSystems, Inc., "Enhancing Web User Experience with Global Server Load Balancing," Jun. 1999, 8 pages.

Krapf, E., "Alteon's Global Server Load Balancing," *Business Communications Review*, Jan. 1999, p. 60, retrieved Oct. 25, 2002, from http://www.bcr.com/bcrmag/1999/01/p60.asp, 3 pages.

Nortel Networks, "Alteon Personal Content Director," © 2001, can be retrieved from http://www.nortelnetworks.com/personalinternet, 4 pages.

IBM Corp., *IBM WebSphere Performance Pack: Load Balancing with IBM SecureWay Network Dispatcher*, First Edition, Chapters 1, 2, 4, and 8, Oct. 1999.

IBM Corp., *SecureWay® Network Dispatcher: User's Guide—Version 2.1 for AIX, Solaris, and Windows NT*, Third Edition, Chapters 3, 4, 9, 10, 11, and Appendices C & E, Mar. 1999.

Bestavros, Azer, "WWW Traffic Reduction and Load Balancing through Server-Based Caching," *IEEE Concurrency*, pp. 56-67, Jan.-Mar. 1997.

Paul, Arindam et al., "Balancing Web Server Load for Adaptable Video Distribution," *IEEE* pp. 469-476, 2000.

AlteonWebSystems, "PCD White Paper," *AlteonWebSystems*, pp. 1-8, Mar. 2001.

Cardellini, V., et al., "Dynamic Load Balancing on Web-server Systems," *IEEE Internet Computing*, 3(3):28-39, May-Jun. 1999.

Foundry Networks, Inc., "Server Load Balancing in Today's Web-enabled Enterprises," *White Paper*, pp. 1-10, Apr. 2002.

Genova, Z., et al., "Challenges in URL Switching for Implementing Globally Distributed Web Sites," *IEEE*, pp. 89-94, 2000.

U.S. Appl. No. 09/670,487, filed Sep. 26, 2000, Hsu et al.
U.S. Appl. No. 10/206,580, filed Jul. 25, 2002, Kommula et al.
U.S. Appl. No. 10/214,921, filed Aug. 7, 2002, Kommula.
U.S. Appl. No. 10/305,823, filed Nov. 27, 2002, Joshi et al.
U.S. Appl. No. 10/377,364, filed Feb. 28, 2003, Kommula.
U.S. Appl. No. 10/674,627, filed Sep. 29, 2003, Joshi.
U.S. Appl. No. 10/839,919, filed May 6, 2004, Joshi.
U.S. Appl. No. 10/840,496, filed May 6, 2004, Joshi.
U.S. Appl. No. 10/924,552, filed Aug. 23, 2004, Joshi.
U.S. Appl. No. 11/429,177, filed May 5, 2006, Joshi et al.
U.S. Appl. No. 11/707,697, filed Feb. 16, 2007, entitled "Global Server Load Balancing," inventor: Sunanda L. Kommula et al.

Genova, Z., et al., "Challenges to URL Switching for Implementing Globally Distributed Web Sites," Department of Computer Science and Engineering, University of South Florida, pp. 1-9, Aug. 11, 2000.

Cisco Document, "Configuring the CSS Domain Name Service,", posted on Dec. 2000, Cisco Systems Inc., http://www.ciscosystems.com, pp. 1-13.

Venkataramani, A., et al., "TCP Nice: A Mechanism for Background Transfer," Proceedings of the Fifth Symposium on Operating Systems Design and Implementation (OSDI'02), ISBN:1-931971-06-4, 329-343, 2002.

Joshi, "Smoothing Algorithm for Round Trip Time (RTT) Measurements," assigned U.S. Appl. No. 12/177,021, filed Jul. 21, 2008.

U.S. Appl. No. 11/741,480, filed Apr. 27, 2007, Hsu et al.
U.S. Appl. No. 12/272,618, filed Nov. 17, 2008, Hsu et al.
U.S. Appl. No. 12/353,701, filed Jan. 14, 2009, Joshi.

Doeringer et al., "Routing on Longest-Matching Prefixes," IEEE/ACM Transactions on Networking, vol. 4, No. 1, Feb. 1996, pp. 86-97.

* cited by examiner

GLOBAL SERVER LOAD BALANCING

CROSS-REFERENCE TO RELATED APPLICATIONS

The present application is a continuation-in-part of U.S. application Ser. No. 10/206,580, entitled "GLOBAL SERVER LOAD BALANCING," filed Jul. 25, 2002, which is a continuation-in-part of U.S. application Ser. No. 09/670,487, entitled "GLOBAL SERVER LOAD BALANCING," filed Sep. 26, 2000, both of which are assigned to the same assignee as the present application, and are incorporated herein by reference their entireties.

BACKGROUND OF THE INVENTION

1. Field of the Invention

This disclosure relates generally to load balancing among servers. More particularly but not exclusively, the present disclosure relates to achieving load balancing by, in response to resolving a DNS query by a client, providing the address of a server that is expected to serve the client with a high performance in a given application.

2. Description of the Related Art

Under the TCP/IP protocol, when a client provides a symbolic name ("URL") to request access to an application program or another type of resource, the host name portion of the URL needs to be resolved into an IP address of a server for that application program or resource. For example, the URL (e.g., http://wwwfoundrynet.com/index.htm) includes a host name portion www.foundrynet.com that needs to be resolved into an IP address. The host name portion is first provided by the client to a local name resolver, which then queries a local DNS server to obtain a corresponding IP address. If a corresponding IP address is not locally cached at the time of the query, or if the "time-to-live" (TTL) of a corresponding IP address cached locally has expired, the DNS server then acts as a resolver and dispatches a recursive query to another DNS server. This process is repeated until an authoritative DNS server for the domain (e.g., foundrynet.com, in this example) is reached. The authoritative DNS server returns one or more IP addresses, each corresponding to an address at which a server hosting the application ("host server") under the host name can be reached. These IP addresses are propagated back via the local DNS server to the original resolver. The application at the client then uses one of the IP addresses to establish a TCP connection with the corresponding host server. Each DNS server caches the list of IP addresses received from the authoritative DNS server for responding to future queries regarding the same host name, until the TTL of the IP addresses expires.

To provide some load sharing among the host servers, many authoritative DNS servers use a simple round-robin algorithm to rotate the IP addresses in a list of responsive IP addresses, so as to distribute equally the requests for access among the host servers.

The conventional method described above for resolving a host name to its IP addresses has several shortcomings. First, the authoritative DNS server does not detect a server that is down. Consequently, the authoritative DNS server continues to return a disabled host server's IP address until an external agent updates the authoritative DNS server's resource records. Second, when providing its list of IP addresses, the authoritative DNS server does not take into consideration the host servers' locations relative to the client. The geographical distance between the server and a client is a factor affecting the response time for the client's access to the host server. For example, traffic conditions being equal, a client from Japan could receive better response time from a host server in Japan than from a host server in New York. Further, the conventional DNS algorithm allows invalid IP addresses (e.g., that corresponding to a downed server) to persist in a local DNS server until the TTL for the invalid IP address expires.

SUMMARY OF THE INVENTION

One aspect of the present invention provides an improved method and system for serving IP addresses to a client, based on a selected set of performance metrics. In accordance with this invention, a global server load balancing (GSLB) switch is provided as a proxy for an authoritative DNS server, together with one or more site switches each associated with one or more host servers. Both the GSLB switch and the site switch can be implemented using the same type of switch hardware in one embodiment. Each site switch provides the GSLB switch with current site-specific information regarding the host servers associated with the site switch. Under one aspect of the present invention, when an authoritative DNS server resolves a host name in a query and returns one or more IP addresses, the GSLB switch filters the IP addresses using the performance metrics compiled from the site-specific information collected from the site switches and/or other metrics. The GSLB switch then returns a ranked or weighted list of IP addresses to the inquirer. In one embodiment, the IP address that is estimated to provide the best-expected performance for the client is placed at the top of the list.

Examples of suitable performance metrics include availability metrics (e.g., a server's or an application's health), load metrics (e.g., a site switch's session capacity or a corresponding preset threshold), and proximity metrics (e.g., a round-trip time between the site switch and a requesting DNS server, the geographic location of the host server, the topological distance between the host server and the client program). (A topological distance is the number of hops between the server and the client). Another proximity metric is the site switch's "flashback" speed (i.e., how quickly a switch receives a health check result). Yet another metric is a connection-load metric that is based on a measure of new connections-per-second at a site. The ordered list can also be governed by other policies, such as the least selected host server.

In accordance with embodiments of the invention, a weighted site or a weighted IP metric can be used. The weighted site metric can be based on a weight that determines how much traffic a site will receive with respect to other sites in comparison, while the weighted IP can be based on a weight that determines how much traffic an IP address will receive with respect to other IP addresses in comparison. An embodiment provides an active bindings metric that is based on a measure of the number of active real servers bound to a virtual IP address residing on a GSLB site. The active bindings metric bases its selection of the best IP address on this number and prefers a VIP with the highest number of active bindings.

The present invention is better understood upon consideration of the detailed description of the embodiments below, in conjunction with the accompanying drawings.

BRIEF DESCRIPTION OF THE DRAWINGS

FIG. 2D depicts the relative position of portions of the flow chart.

DETAILED DESCRIPTION

Embodiments for global server load-balancing are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
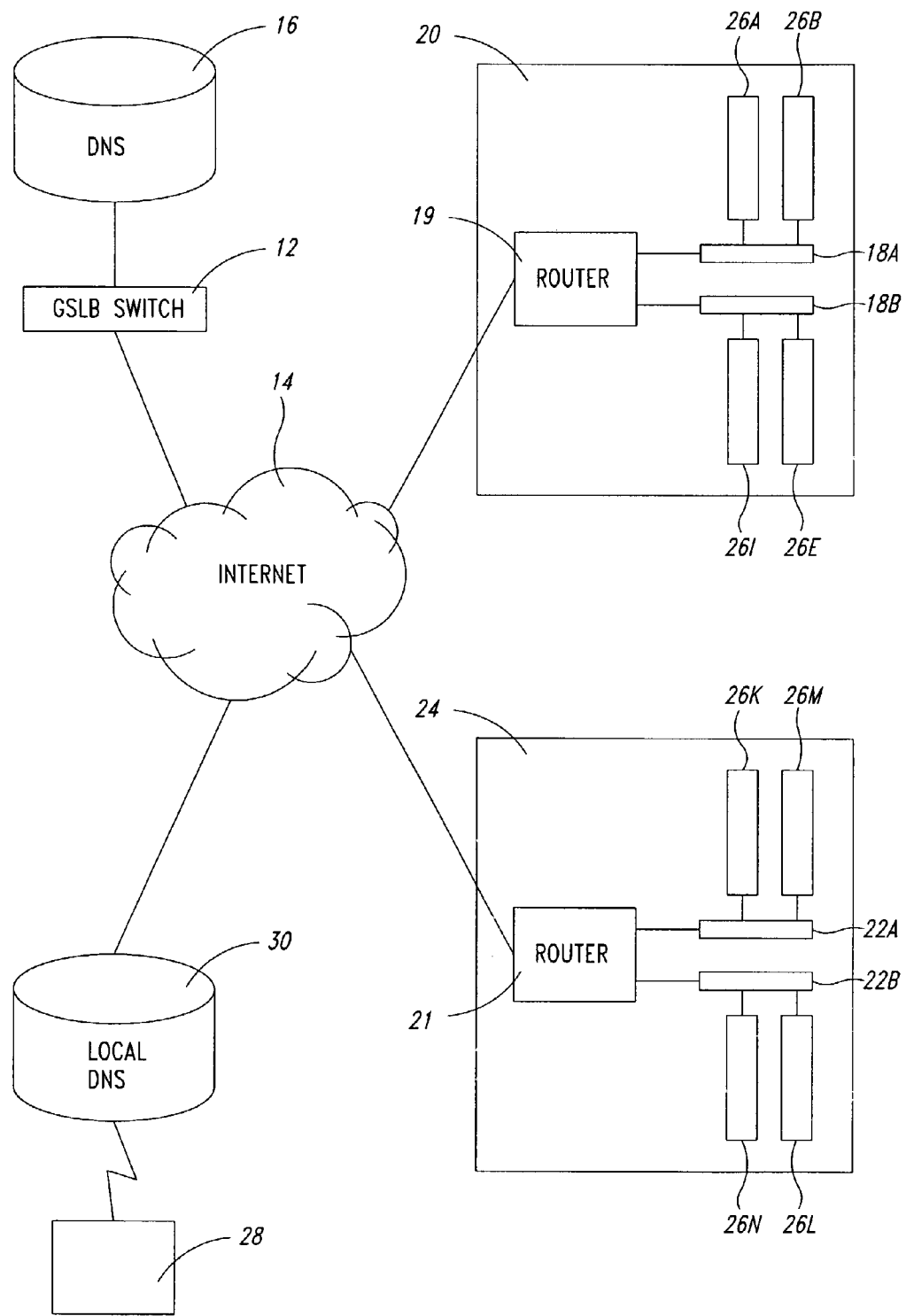
FIG. 1 illustrates a global server load-balancing configuration in accordance with one embodiment of the invention.

FIG. 1 illustrates one embodiment of the present invention that provides a global server load-balancing configuration. As shown in FIG. 1, a global server load balancing (GSLB) switch 12 is connected to an Internet 14 and acts as a proxy to an authoritative Domain Name System (DNS) server 16 for the domain "foundrynet.com" (for example). That is, while the actual DNS service is provided by DNS server 16, the IP address known to the rest of the Internet for the authoritative DNS server of the domain "foundrynet.com" is a virtual IP (VIP) address configured on GSLB switch 12. Of course, DNS server 16 can also act simultaneously as an authoritative DNS server for other domains. GSLB switch 12 communicates, via Internet 14, with site switches 18A and 18B at site 20, site switches 22A and 22B at site 24, and any other similarly configured site switches. Site switch 18A, 18B, 22A and 22B are shown, for example, connected to routers 19 and 21 respectively and to servers 26A, ..., 26I, ... 26N. Some or all of servers 26A, ..., 26I, ..., 26N may host application server programs (e.g., http and ftp). These host servers are reached through site switches 18A, 18B, 22A and 22B using one or more virtual IP addresses configured at the site switches, which act as proxies to the host servers. A suitable switch for implementing either GSLB switch 12 or any of site switches 18A, 18B, 22A and 22B is the "ServerIron" product available from Foundry Networks, Inc. of San Jose, Calif.

FIG. 1 also shows a client program 28 connected to Internet 14, and communicates with local DNS server 30. When a browser on client program 28 requests a web page, for example, using a Universal Resource Locator (URL), such as http://www.foundrynet.com/index.htm, a query is sent to local DNS server 30 to resolve the symbolic host name www.foundrynet.com to an IP address of a host server. The client program 28 receives from DNS server 30 a list of IP addresses corresponding to the resolved host name. This list of IP addresses is either retrieved from local DNS server 30's cache, if the TTL of the responsive IP addresses in the cache has not expired, or obtained from GSLB switch 12, as a result of a recursive query. Unlike the prior art, however, this list of IP addresses is ordered by GSLB switch 12 based on metrics described in further detail below.

In the remainder of this detailed description, for the purpose of illustrating embodiments of the present invention only, the list of IP addresses returned are assumed to be the virtual IP addresses configured on the proxy servers at switches 18A, 18B, 22A and 22B (sites 20 and 24). In one embodiment, GSLB switch 12 determines which site switch would provide the best expected performance (e.g., response time) for client program 28 and returns the IP address list with a virtual IP address configured at that site switch placed at the top. (Within the scope of the present invention, other forms of ranking or weighting the IP addresses in the list can also be possible.) Client program 28 can receive the ordered list of IP addresses, and typically selects the first IP address on the list to access the corresponding host server.

Figure 3:
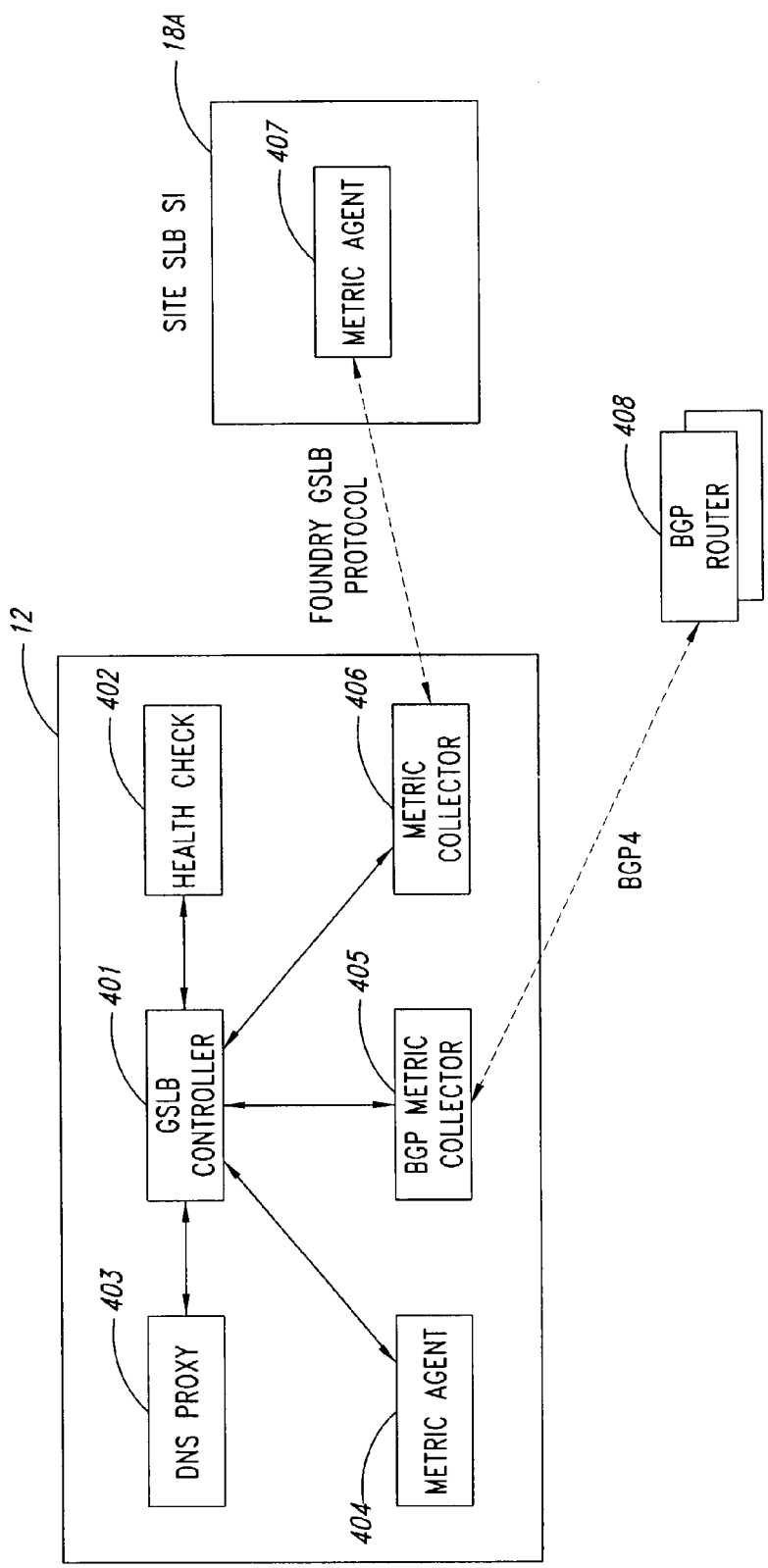
FIG. 3 is a block diagram showing the functional modules of a GSLB switch and a site switch relevant to the global server load balancing function in accordance with one embodiment of the invention.

FIG. 3 is a block diagram showing the functional modules of GSLB switch 12 and site switch 18A relevant to the global server load balancing function. As shown in FIG. 3, GSLB switch 12 includes a GSLB switch controller 401, health check module 402, DNS proxy module 403, metric agent 404, routing metric collector 405, and metric collector 406. GSLB switch controller 401 provides general control functions for the operation of GSLB switch 12. Health check module 402 is responsible for querying, either periodically or on demand, host servers and relevant applications hosted on the host servers to determine the "health" (e.g., whether or not it is available) of each host server and each relevant application. The metric collector 406 communicates with metric agents in site-specific switches (e.g., FIG. 3 shows metric collector 406 communicating with metric agent 407 of a site server load balancing ServerIron or "SLB SI") to collect site-specific metrics (e.g., number of available sessions on a specific host server and/or connection-load data at that host server or other metric data). Any suitable communication protocol can be used for the communication between the metric collector 406 and the metric agent 407.

For example for a connection-load metric in one embodiment, metric agent(s) 407 can perform sampling to obtain connections-per-second at their respective site, and then obtains load averages from the samples or performs other calculations. The metric collector 406 of the GLSB switch 12 then obtains the load averages from the metric agent(s) 407 and provides these load averages to the switch controller 401, to allow the switch controller 401 to use the load averages to rank the IP addresses on the ordered list. Alternatively or in addition to the metric agent(s) 407, the switch controller 401 can perform at least some or most of the connection-load calculations from sampling data provided by the metric agent(s) 407.

Routing metric collector 405 collects routing information from routers (e.g., topological distances between nodes on the Internet). FIG. 3 shows, for example, router 408 providing routing metric collector 405 with routing metrics (e.g., topological distance between the load balancing switch and the router), using the Border Gateway Protocol (BGP). DNS proxy module 403 (a) receives incoming DNS requests, (b) provides the host names to be resolved to DNS server 16, (c) receives from DNS server 16 a list of responsive IP addresses, (d) orders the IP addresses on the list received from DNS server 16 according to an embodiment of the present invention, using the metrics collected by routing-metric collector 405 and site specific collector 406, and values of any other relevant parameter, and (e) provides the ordered list of IP addresses to the requesting DNS server. Alternatively or in addition, the GSLB switch controller 401 can perform at least some of these operations. Since GSLB switch 12 can also act as a site switch, GSLB switch 12 is provided a metric agent 404 for collecting metrics for a metric collector.

In one embodiment, the GSLB switch controller 401 can be programmed with data to be used for at least one of weighted site, weighted IP, or active bindings metrics. For example for the weighted site metric, the GSLB switch controller 401 can be programmed with the assigned weights for particular sites (e.g., the sites 20 and 24). For example for the weighted IP metric, the GSLB switch controller 401 can be programmed with the assigned weights for IP addresses for a particular zone. Alternatively or in addition to being programmed into the GSLB switch controller 401, these weight assignments can be stored in a component (such as in a database or memory) that is remote from, but accessible to, the GSLB switch controller 401 (or other component of the GSLB switch that can use this metric to reorder address lists).

In one embodiment, the metrics used in a GSLB switch 12 includes, but are not limited to: (a) the health of each host server and selected applications, (b) the assigned weights under the weighted site metric, or under the weighted IP metric in the alternative, (c) each site switch's session capacity threshold, (d) the round trip time (RTT) between a site switch and a client in a previous access, (e) the geographical location of a host server, (f) the connection-load measure of new connections-per-second at a site switch, (g) the current available session capacity in each site switch, (h) active bindings or the measure of the number of active real servers bound to a VIP residing on a GSLB site, (i) the "flashback" speed between each site switch and the GSLB switch (i.e., how quickly each site switch responds to a health check from the GSLB switch), and (j) a policy called the "Least Response Selection" (LRS) which prefers the site least selected previously. Many of these performance metrics can be provided default values. Each individual metric can be used in any order and each metric can be disabled. In one embodiment, the LRS metric is always enabled.

Figure 2A:
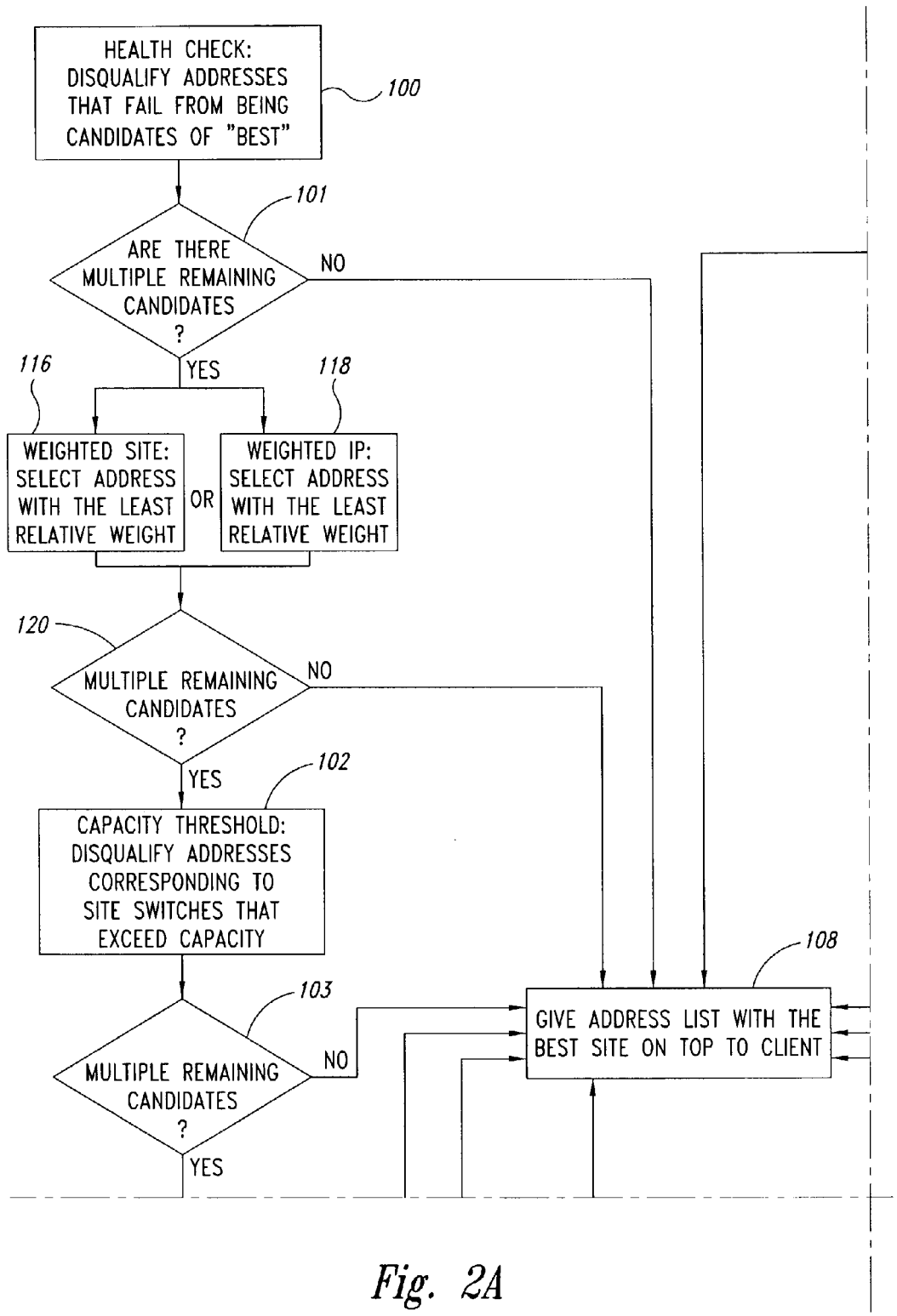
FIGS. 2A-2D illustrate in a flow chart one embodiment of an algorithm for selecting the "best" address from the list of addresses supplied by an authoritative DNS, where
Figure 2B:
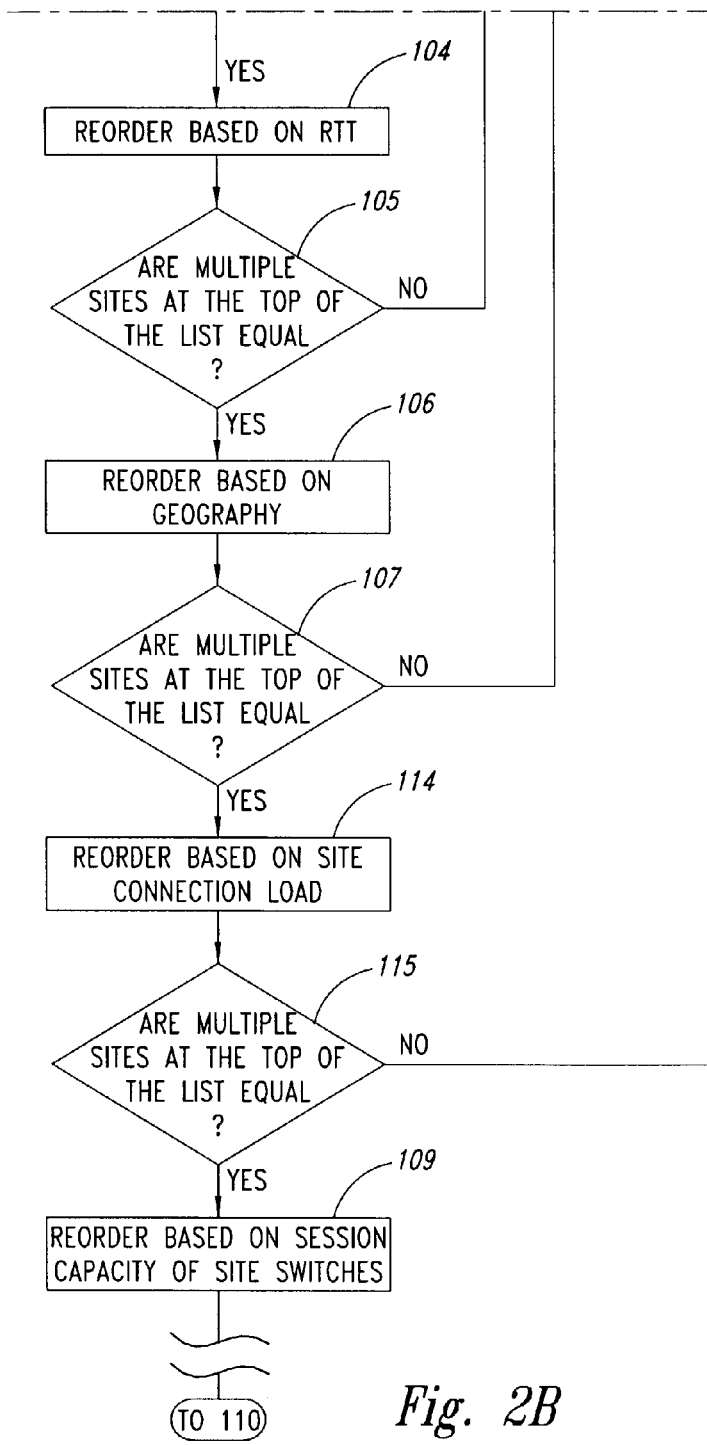
Figure 2C:
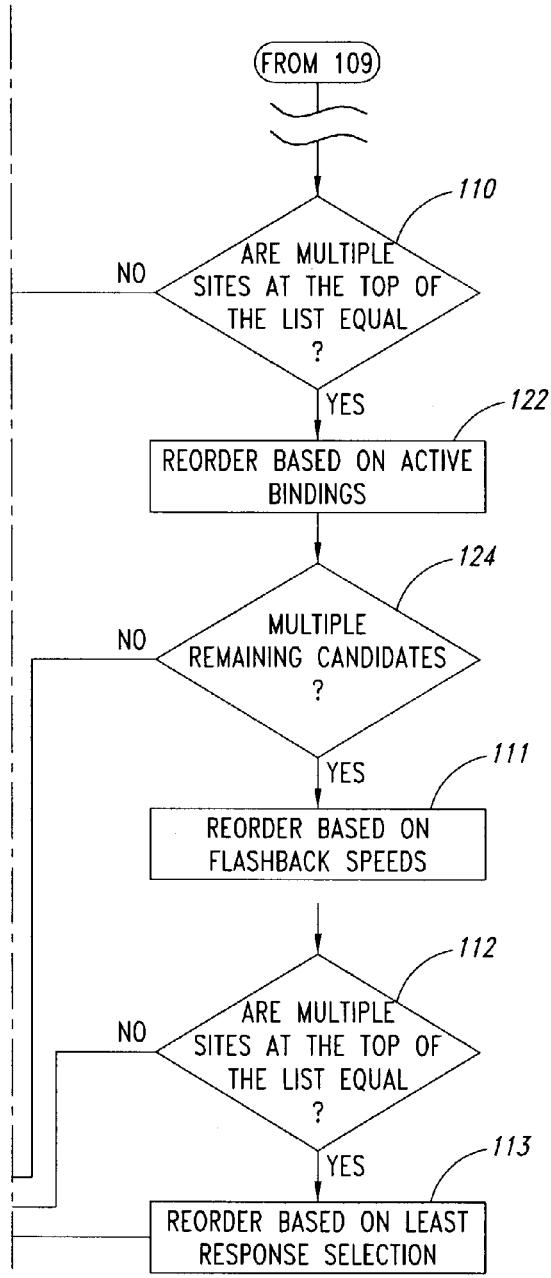
Figure 2D:
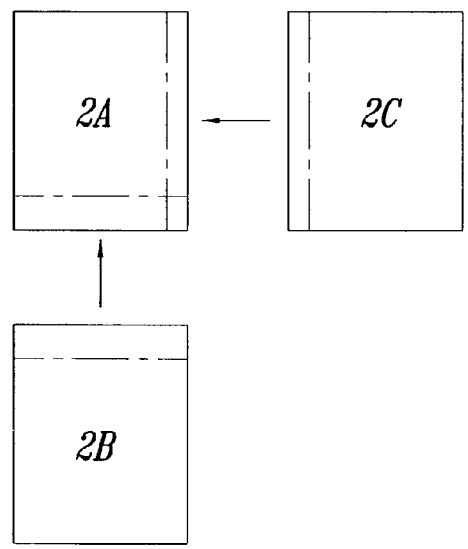

FIGS. 2A-2D illustrate in a flow diagram one embodiment of an optimization algorithm utilized by GSLB switch 12 to process the IP address list received from DNS server 16, in response to a query resulting from client program 28, where FIG. 2D shows the relative position of portions of the flow diagram shown in FIGS. 2A-2C. At least some of the elements of the flow diagram can be embodied in software or other machine-readable instruction stored on one or more machine-readable storage media. For example, such software to perform portions of the algorithm may be present at the GSLB switch 12 in one embodiment and executed by the switch controller 401.

As shown in FIG. 2A, in act 100, upon receiving the IP address list from DNS server 16, GSLB switch 12 performs, for each IP address on the IP address list (e.g., host server 26I connected to site switch 18B), a layer 4 health check and a layer 7 check. Here, layers 4 and 7 refer respectively to the transport and application protocols in the Open System Interconnection (OSI) protocol layers. The layer 4 health check can be a Transmission Control Protocol (TCP) health check or a User Datagram Protocol (UDP) health check. Such a health check can be achieved, for example, by a "ping-like" operation defined under the relevant protocol. For example, under the TCP protocol, a TCP SYN packet can be sent, and the health of the target is established when a corresponding TCP ACK packet is received back from the target. In this embodiment, the layer 7 health check is provided for specified applications, such as the well-known HyperText Transport Protocol (HTTP) and the File Transfer Protocol (FTP) applications. An embodiment of a technique to distribute health check tasks to peer metric agents (e.g., the metric agents 407) is disclosed in U.S. application Ser. No. 10/305,823, entitled "DISTRIBUTED HEALTH CHECK FOR GLOBAL SERVER LOAD BALANCING," filed Nov. 27, 2002, with inventor Prajakta S. Joshi et al., assigned to the same assignee as the present application and incorporated herein by reference in its entirety.

If a host server or an associated application fails any of the health checks, it is disqualified from being the "best" site and may be excluded from the IP address list to be returned to client program 28. Since the health check indicates whether or not a host server or an associated application is available, the health check metric is suitable for use to eliminate an IP address from the candidates for the "best" IP address (i.e., the host server expected to provide the highest performance). After act 100, if the list of IP addresses has only one IP address (act 101), the list of IP addresses is returned to client program 28 at act 108.

After act 100, if the list of candidate IP addresses for the best site has multiple IP addresses, then the list of candidate IP addresses is assessed next either under the weighted site metric at act 116 or under the weighted IP metric at act 118. In an embodiment, only one of these two metrics can be enabled at any one time. The weighted site metric at act 116 will be described herein first, followed by the weighted IP metric at act 118.

With the weighted site metric, traffic can be distributed among sites (e.g., the sites 20 and 24) based on weights configured for those sites. The GSLB switch controller 401 achieves the distribution by selecting an IP address belonging to a particular site to be the best IP address in the DNS reply to the client program 28, and the client program 28 subsequently makes request to access that IP address.

The weighted site metric is an optional metric in the GSLB algorithm of FIGS. 2A-2D. It is disabled by default in an embodiment, and when enabled, it is placed by default after the health-check metric at act 100. Placing the weighted site (or weighted IP) metric after the health check metric is beneficial in that the health check metric eliminates sites that are down, and thus deviates traffic from these sites. It is appreciated that the default metric order can be changed anytime using any suitable metric-order command at the policy configuration level.

To use the weighted site-metric, the metric is enabled and weights are assigned to the GSLB sites (e.g., the sites 20 and 24). Each site may include of one or more site switches (e.g., the site switches 18A and 18B for the site 20), but the weight is applicable to the site on the whole. This weight determines how much traffic the site will receive with respect to other sites in comparison, which themselves may or may not be weighted.

For example, three sites may be assigned the following weights: San Jose: 50; New York: 30; and London: 20, which instructs the GSLB switch controller 401 to send 50% of the traffic to San Jose, 30% of the traffic to New York and 20% of the traffic to London. The weight assigned to a site determines the percentage of traffic that the site will receive relative to weights of other sites in comparison. According to various embodiments, these programmed weights may be present in databases, lookup tables, software code, memory, or other data repository at the GSLB switch 12 or other accessible location, including at the sites themselves.

In the above-mentioned example, the distribution is straightforward because the total weight of all three sites is 100, which makes the distribution simpler. However, a total weight of 100 is not a requirement. Weights may be chosen such as: San Jose: 15; New York: 20; and London: 10, making the total weight 45. Thus, the traffic distribution will be: San Jose: 33% (15/45*100); New York: 44% (20/45*100); and London: 22% (10/45*100). The relative percentages may be calculated by the GSLB switch controller 401 (or by some other component or software) by normalizing the total weight to 100%.

When evaluating the potential candidates using the weighted site metric at act 116, the GSLB switch controller 401 bases the selection on the number of times an IP address is already selected, since it generally cannot be accurately anticipated how many requests are going to be made in the future. One or more counters (not shown) may be present in the GSLB switch 12 to count each time an IP address is selected as best, although it is appreciated that external servers or other components can be used alternatively or in addition to the counter(s) to track such selection data. The following formula is used in one embodiment to compute a relative weight for each IP address and to select the IP address with the least relative weight:

$$RelativeWeight_{ip} = (SelectionCounter_{ip} * Sum_{x=1\ to\ N}\{Weight_{ip\_x}\})/Weight_{ip}$$

where, $SelectionCounter_{ip}$: refers to a number of times the GSLB switch controller 401 selected the IP address as the best choice over the other candidates;

N: refers to a number of eligible candidate IP addresses to be evaluated by the weighted site metric; and $Weight_{ip}$: refers to a calculated weight assigned to an IP address based on the following criteria:

If the IP address corresponds to a real server, then $Weight_{ip}$ is zero (0). In such cases, $RelativeWeight_{ip}$ is calculated to be MaxRelativeWeight; and If the IP address is a virtual IP (VIP) address, then $Weight_{vip}$ is calculated as follows:

$$Weight_{vip} = Weight_{Site\_X}/NumCandidateVips_{SiteX}$$

where,

Site X: refers to the site to which the VIP belongs;

$Weight_{Site\_X}$: refers to weight of Site_X; and $NumCandidateVips_{Site\_X}$: refers to a number of candidate VIP addresses belonging to Site_X that are being evaluated by the weighted site metric.

It is noted that in an embodiment, if the $RelativeWeight_{ip}$ of an IP address is equal to MaxRelativeWeight, the IP address is eliminated from being selected as the best IP address. This will be the case for all real servers and also for VIP addresses that belong to sites with no weights configured or configured with weights of zero. If the user wishes to use the weighted site metric, the user assumes that all IP addresses are VIP addresses belonging to sites to which the user wishes to distribute traffic. If the user wants a site to be ignored by the weighted site metric, the site can be ignored by not configuring a weight for that site. Since a real server is not part of any site in one implementation, an embodiment mimics the same behavior and assigns the real server with a weight of zero (0), so that the real server is ignored when the weighted site metric evaluates candidate IP addresses.

If all candidate IP addresses have a $RelativeWeight_{ip}$ of MaxRelativeWeight at act 120, the weighted site metric will make no selection and passes all the candidates to the next stage in the GSLB algorithm. Likewise, if two or more VIP addresses have equal values of $RelativeWeight_{ip}$ at act 120, all of them are passed on as eligible candidates to the next stage in the GSLB algorithm. If there are no multiple remaining address candidates at act 120 after application of the weighted site metric, then the IP address list (with the best IP address placed on top) is passed to the client program 28 at act 108

If DNS response selection counters are maintained per domain name in one embodiment, the weighted site metric distribution is accurate with respect to the domain name. Consider the following example:

Assume three sites with the following weights: San Jose (50); New York (30); and London (20). All three sites host the application www.gslb.com and sites New York and London also host ftp.gslb.com. This scenario is illustrated below:

www.gslb.com 1.1.1.1 (VIP address, belongs to site San Jose, with weight 50)

1.1.1.2 (VIP address, belongs to site New York, with weight 30)

1.1.1.3 (VIP address, belongs to site London, with weight 20)

ftp.gslb.com 1.1.1.2 (VIP address, belongs to site New York, with weight 30)

1.1.1.3 (VIP address, belongs to site London, with weight 20)

Assuming 10 DNS requests (for example) are made to www.gslb.com, the traffic distribution among the sites is San Jose (5 requests, 50%), New York (3 requests, 30%), and London (2 requests, 20%). This distribution can be viewed by looking at the DNS selection counters for www.gslb.com, such as by using a command line interface (CLI) command: show gslb dns zone.

Now for example, if 5 requests are made to ftp.gslb.com and since an embodiment maintains counters per domain and not per IP address, the distribution is New York (3 requests, 60%) and London (2 requests, 40%), which reflects the weights 30 and 20, normalized to 60 and 40 respectively. However, if the total site traffic for both applications is considered, then the traffic distribution is San Jose (5 requests, 33%), New York (6 requests, 40%) and London (4 requests, 26%), which does not correlate with the weights assigned to the sites. Hence, the results of the weighted metric is evaluated by an embodiment with respect to a specific domain name.

To use the weighted site metric, the metric is enabled in the GSLB algorithm (or policy) and weights are assigned to configured sites. These may be performed by a system administrator or in an automated manner via software. The various implementations below use example CLI commands for purposes of illustration and explanation. It is appreciated that other embodiments can perform the relevant operation using different types of commands and/or other syntax.

The weighted site metric can be enabled/disabled at the "gslb policy" config level of the CLI using the following:

SLB-ServerIron(config-gslb-policy)# [no] weighted-site

The weights can be configured per site at the "gslb site <site-name>" configuration level using the following CLI command for San Jose (as an example site):

SLB-ServerIron(config-gslb-policy)# gslb site SanJose

SLB-ServerIron(config-gslb-site-SanJose)# weight 50

The default metric order can be changed using the following CLI command:

SLB-ServerIron(config-gslb-policy)# metric-order set weighted-site

The results of the distribution can be viewed with the following CLI command:

SLB-ServerIron(config)#show gsib traffic site

This command shows for each site, all domains hosted by the site, and for each domain name, the amount of traffic is sent to each site switch (a ServerIron SI) at that site and the total percentage of traffic sent to the site. The following is a sample output of the command:

3/1 #show gslb traffic site

| 3/1 #show gslb traffic site | | |
|---|---|---|
| SITE: local | | Weight: 50 |
| * a.b.c | | |
| DNS Requests: 36 | | |
| SI | VIP | Selection (%) |
| 1.1.1.1 | 1.1.1.181 | 9 (25%) |
| 1.1.1.1 | 1.1.1.180 | 9 (25%) |
| Site Selection for Domain: 18 (50 %) | | |
| * b.b.c | | |
| DNS Requests: 0 | | |
| SI | VIP | Selection (%) |
| 1.1.1.1 | 1.1.1.121 | 0 (0%) |
| Site Selection for Domain: 0 (0 %) | | |
| SITE: TWO | | Weight: 50 |
| * a.b.c | | |
| DNS Requests: 36 | | |
| SI | VIP | Selection (%) |
| 1.1.1.2 | 1.1.1.182 | 18 (50%) |
| Site Selection for Domain: 18 (50 %) | | |
| * b.b.c | | |
| DNS Requests: 0 | | |
| SI | VIP | Selection (%) |
| 1.1.1.2 | 1.1.1.122 | 0 (0%) |
| Site Selection for Domain: 0 (0 %) | | |
| SITE: THREE | | |
| * a.b.c | | |
| DNS Requests: 36 | | |
| SI | VIP | Selection (%) |
| 1.1.1.3 | 1.1.1.183 | 0 (0%) |
| Site Selection for Domain: 0 (0 %) | | |
| * b.b.c | | |
| DNS Requests: 0 | | |
| SI | VIP | Selection (%) |
| 1.1.1.3 | 1.1.1.123 | 0 (0%) |
| Site Selection for Domain: 0 (0 %) | | |

In the above example, there are two hosts, a(http) and b(ftp) belonging to the zone b.c. There are three sites as listed below:
  Local (weight: 50, SI: 1.1.1.1, Vips: 1.1.1.180(http), 1.1.1.181(http), 1.1.1.121 (ftp))
  TWO (weight: 50, SI: 1.1.1.2, Vips: 1.1.1.182(http), 1.1.1.122(ftp))
  THREE (weight: 0, SI: 1.1.1.3, Vips: 1.1.1.183(http), 1.1.1.123(ftp))
The IP resolution for the domain names is as follows:
a.b.c: 1.1.1.180, 1.1.1.181, 1.1.1.182, 1.1.1.183
b.b.c: 1.1.1.121, 1.1.1.122, 1.1.1.123
The metric order selected was "site weight," followed by the tie-breaker "least-response-selection" (LRS) where the prior metric was inconclusive. After making 36 requests for domain "a.b.c," the distribution was:
  Site Local: received 18 requests (VIP 1.1.1.180 received 9 requests, and VIP 1.1.1.181 received 9 requests);
  Site TWO: received 18 requests (VIP 1.1.1.182 received all 18 requests); and
  Site THREE: did not receive any requests, owing to its weight zero.

Note that within a site, each VIP address is considered equal by one embodiment of the weighted site metric. The tie between the addresses is broken by the next stage in the GSLB algorithm. In this case, the tie was broken by the "least response" metric, although it is appreciated that any suitable one of the subsequent metrics could have broken the tie. Per-metric response selection counters (not shown) can be viewed by the existing CLI command "show gslb dns detail," which has been extended to include support for the weighted site metric. Examples of implementations of per-metric response counters are disclosed in U.S. application Ser. No. 10/211,822, entitled "STATISTICAL TRACKING FOR GLOBAL SERVER LOAD BALANCING," filed Aug. 1, 2002, and disclosed in U.S. application Ser. No. 10/377,364, entitled "METHOD AND SYSTEM TO CLEAR COUNTERS USED FOR STATISTICAL TRACKING FOR GLOBAL SERVER LOAD BALANCING," filed concurrently herewith, with inventor Sunanda L. Kommula. Both of these co-pending applications are assigned to the same assignee as the present application and are incorporated herein by reference in their entireties.

The weighted IP metric at act 118 is now explained. The weighted IP metric allows a user (e.g., a system administrator) to distribute traffic among IP addresses in the DNS reply, based on the weights configured for the IP addresses. The weighted-IP-metric is an optional metric in the GSLB algorithm of FIGS. 2A-2D in one embodiment, and is disabled by default. When enabled, the weighted IP metric by default is placed after the health check metric of act 100 in the GSLB algorithm. As before, the default metric order can be changed anytime using the "metric-order" command (or other suitable command) at the GSLB policy configuration.

To use the weighted IP metric, the user enables the metric and assigns weights to the desired IP addresses. The weight of an IP address determines the percentage of traffic that the IP address will receive with respect to the other candidate IP addresses, which themselves may or may not be weighted. For example, the user may assign weights to the three IP address for zone www.gslb.com according to the following: 1.1.1.80: 50; 1.1.2.80: 30; and 1.1.3.80: 20. Based on these assigned weights, the GSLB switch controller 401 will send 50% of the traffic to www.gslb.com to 1.1.1.80; 30% to 1.1.2.80; and 20% to 1.1.3.80.

In the above-described example, the distribution is again straightforward because the total weight of all three IP addresses is 100, which makes the distribution simpler. However, having a total weight of 100 is not a requirement. Weights such as 1.1.1.80: 15; 1.1.2.80: 20; and 1.1.3.80: 10 can be chosen, thus making the total weight 45. The traffic distribution in this instance will therefore be 1.1.1.80: 33% (15/45*100); 1.1.2.80: 44% (20/45*100); and 1.1.3.80: 22% (10/45*100). The relative percentages are calculated by normalizing the total weight to 100%.

In an embodiment, when the user configures a zone and a host for GSLB, the GSLB switch controller 401 will start making background DNS queries for the configured zones and hosts and stores the IP addresses that are resolved, and does the necessary pre-processing for each IP address, so as to efficiently serve DNS requests from clients. This behavior remains unchanged when the weighted IP metric is enabled. As usual, the GSLB switch controller 401 resolves configured domain names to IP addresses, and the default weight for each IP address is zero. Once the user configures the weight against an IP address, the weight is used as appropriate by the weighted IP metric.

As with the weighted site metric, the weighted IP metric (when enabled) is placed second in the GSLB algorithm at act 118 after the health check metric at act 100, so as to allow the health check metric to deviate traffic from downed IP addresses. As before, the metric order can be changed or other metrics can be enabled/disabled to satisfy specific requirements.

When evaluating the potential candidates using the weighted IP metric, the selection is based on the number of times an IP address is already selected, since the number of requests that are going to be made in the future generally cannot be anticipated. The following example formula is used in one embodiment to compute a relative weight for each IP address and to select the IP address with the least relative weight:

$$\text{RelativeWeight}_{ip} = (\text{SelectionCounter}_{ip} * \text{Sum}_{x=1\ to\ N}\{\text{Weight}_{ip\_x}\}) / \text{Weight}_{ip}$$

where, $\text{SelectionCounter}_{ip}$: refers to the number of times the GSLB switch controller 401 selected the IP address as the best choice over the other candidates;

N: refers to the number of eligible candidate IP addresses to be evaluated by the weighted IP metric; and $\text{Weight}_{ip}$: refers to the weight assigned to the IP address.

If a weight for an IP address is not assigned or otherwise configured, the $\text{Weight}_{ip}$ of the IP address is assumed to be zero. In such cases, $\text{RelativeWeight}_{ip}$ is calculated to be MaxRelativeWeight. If the $\text{RelativeWeight}_{ip}$ of an IP address is equal to MaxRelativeWeight, the IP address will be eliminated from being selected as the best IP address. This will be the case for all IP addresses with no weights configured or configured with zero (0) weights.

If all candidate IP addresses have a $\text{RelativeWeight}_{ip}$ of MaxRelativeWeight, the weighted IP metric will make no selection and passes all the candidates to the next stage in the GSLB algorithm. Likewise, if two or more IP addresses have equal values of $\text{RelativeWeight}_{ip}$ at act 120, all of them are passed on as eligible candidates to the next stage of the GSLB algorithm. If the weighted IP metric is able to identify the best IP address, based on that IP address having the least relative weight, then that IP address is placed at the top of the address list, and the address list is passed to the client program 28 at act 108.

As mentioned above, to use the weighted IP metric, the user needs to enable the metric in the GSLB policy and assign weights to IP addresses. The weighted IP metric can be enabled/disabled at the "gslb policy" config level of the CLI using the following command:

SLB-ServerIron(config-gslb-policy)# [no] weighted-IP

SLB-ServerIron(config-gslb-policy)# gslb dns zone gslb.com

SLB-ServerIron(config-gslb-dns-gslb.com)# host www http

The second command above configures the zone gslb.com, while the third command above configures the host www as a http application of gslb.com.

The weights can be assigned or configured per IP address at the "gslb dns zone" config level using the following CLI command syntax:

SLB-ServerIron(config-gslb-dns-gslb.com)# host www ip-weight <ip><weight>

An example of this is the following, to assign a weight of 50 to an IP address 1.1.1.80 for the zone gslb.com:

SLB-ServerIron(config-gslb-dns-gslb.com)# host www ip-weight 1.1.1.80 50

The default metric order can be changed using the following CLI command:

SLB-ServerIron(config-gsib-policy)#  metric-order  set weighted-ip

The results of the traffic distribution can be viewed with the following CLI command:

SLB-ServerIron(config)#show gslb dns zone

After act 120, if the list of candidate IP address for the best site has multiple IP addresses after the weighted site or weighted IP metrics are applied, the IP address list is further assessed in act 102 based upon the capacity threshold of the site switch serving that IP address. Each site switch may have a different maximum number of TCP sessions it can serve. For example, the default number for the "ServerIron" product of Foundry Networks is one million sessions, although it can be configured to a lower number. The virtual IP address configured at site switch 18B may be disqualified from being the "best" IP address if the number of sessions for switch 18B exceed a predetermined threshold percentage (e.g., 90%) of the maximum number of sessions. (Of course, the threshold value of 90% of the maximum capacity can be changed.) After act 102, if the list of IP addresses has only one IP address (act 103), the list of IP addresses is returned to client program 28 at act 108.

After act 102, if the IP address list has multiple IP addresses (act 103), the remaining IP addresses on the list can then be reordered in act 104 based upon a round-trip time (RTT) between the site switch for the IP address (e.g., site switch 18B) and the client (e.g., client 28). The RTT is computed for the interval between the time when a client machine requests a TCP connection to a proxy server configured on a site switch, sending the proxy server a TCP SYN packet, and the time a site switch receives from the client program a TCP ACK packet. (In response to the TCP SYN packet, a host server sends a TCP SYN ACK packet, to indicate acceptance of a TCP connection; the client machine returns a TCP ACK packet to complete the setting up of the TCP connection.) The GSLB switch (e.g., GSLB switch 12) maintains a database of RTT, which it creates and updates from data received periodically from the site switches (e.g., site switches 18A, 18B, 22A and 22B). Each site collects and stores RTT data for each TCP connection established with a client machine. In one embodiment, the GSLB switch favors one host server over another only if the difference in their RTTs with a client machine is greater than a specified percentage, the default specified percentage value being 10%, for example. To prevent bias, the GSLB switch ignores, by default, RTT values for 5% of client queries from each responding network, for example. After act 105, if the top entries on the list of IP addresses do not have equal RTTs, the list of IP addresses is returned to client program 28 at act 108.

If multiple sites have equal RTTs (act 105), then the list is reordered in act 106 based upon the location (geography) of the host server. The geographic location of a server is determined according to whether the IP address is a real address or a virtual IP address ("VIP"). For a real IP address, the geographical region for the host server can be determined from the IP address itself. Under IANA, regional registries RIPE (Europe), APNIC (Asia/Pacific Rim) and ARIN (the Americas and Africa) are each assigned different prefix blocks. In one embodiment, an IP address administered by one of these regional registries is assumed to correspond to a machine located inside the geographical area administered by the regional registry. For a VIP, the geographic region is determined from the management IP address of the corresponding site switch. Of course, a geographical region can be prescribed for any IP address to override the geographic region determined from the procedure above. The GSLB switch prefers an IP address that is in the same geographical region as the client machine in an embodiment. At act 107, if the top two entries on the IP list are not equally ranked, the IP list is sent to the client program 28 at act 108.

After act 107, if multiple sites are of equal rank for the best site, the IP addresses can then be reordered based upon site connection load (act 114). The connection-load metric feature allows comparison of sites based on the connection-load on their respective agent (e.g., at the metric agent 407 of the site ServerIron switch 18A in FIG. 3, for instance).

The connection-load is a measure of new connections-per-second on the agent 407 in one embodiment. An administrator can set a threshold limit for the connection-load to pass a given site; can select the number of load sampling intervals and duration of each interval; and can select the relative weight for each interval to calculate the average load for a period of time (i.e., new connections per the period of time).

The "connection load limit" value specifies the load limit for any site to pass the metric. The minimum value is 1, and a parser or other software component in the site switch 18A, for instance, limits the maximum value—there need not be a default value. By default, this connection-load metric is turned off and can be turned on when the load limit is specified. The average load for a given site is calculated using the user-defined weights and intervals, which will be explained later below. If the calculated average load is less than the load limit specified, the site is passed on to the next stage of the GSLB algorithm described herein—otherwise that site is eliminated/rejected from the set of potential candidates.

In one embodiment, the number of "load sampling intervals" and also the "sampling rate" can be configured. The sampling rate defines the duration of each sampling interval in multiples of the initial rate. For example, if 6 sampling intervals and a sampling rate of 5 seconds are chosen, the site will sample the average load at 5, 10, 15, 20, 25, and 30. At any instant, the site will have the average load for the previous 5 seconds, 10 seconds, 15 seconds, 20 seconds, 25 seconds, and 30 seconds. This is a "moving average" in that at the 35th second, for example, the average for the 5th to 35th seconds is calculated. Note that even though this is a moving average, the accuracy is limited by the initial sampling rate, meaning that since samples are taken after every 5 seconds, at the 7th second, the average for the 1st to 5th second is available and not the 2nd to 7th second average.

The sampling rate also defines the update interval for the site (e.g., the site-specific metric agent 407) to upload the load averages to the metric collector 406 at the GSLB switch 12. A given site is capable of maintaining load-averages for any number of collectors at a time. Each collector is updated with the load information periodically, and the update interval is also specific to the collector in various example embodiments.

The minimum number of intervals is 1 and the max is 8 in one embodiment. The default number is 5, which is set when the connection load limit is configured. It is appreciated that these are merely illustrative examples and may be different based on the particular implementation.

For the load-sampling interval, the minimum value is 1 second and maximum value is 60 seconds. The default value is 5 seconds. So, the maximum range for load average calculation is 60*8 seconds=480 seconds=8 minutes. Thus, one can consider up to the previous 8-minute average for load analysis. Again, these are example settings.

Weights can be assigned to each interval to calculate the average load. By default in one embodiment, each interval is given an equal weight of 1. The average load for a site can be calculated using the following formula:

$$\frac{\sum_{i=0}^{N} (\text{AvgLoad of interval } i) * (\text{Weight of interval } i)}{\sum_{i=0}^{N} (\text{Weight of interval } i)}$$

where N=Number of sampling intervals and AvgLoad of interval i=new connections of interval i.

The contribution of any interval can be nullified by giving it a weight of zero. If every interval is given a weight of zero, the average load is zero. (We cannot divide by zero). In one embodiment, the metric agent 407 can calculate this average load and provide it to the metric collector 406 at the GSLB switch 12. In other embodiments, the metric collector 406 and/or the switch controller 401 can perform the average load calculation based on values collected and provided by the metric agent 407.

By default, the connection-load metric is not turned on in the GSLB algorithm. The metric is automatically turned on when the user specifies the connection-load limit, in an embodiment. The specific configuration needs for connection-load sampling and calculation can be configured on the switch controller 401, whether the switch 12 is used for GSLB or as a site-specific switch.

To configure the connection load limit (such as a connection load limit of 500), at the GSLB policy configuration level, the following example command can be used:

SW-GSLB-Controller (config-gslb-policy) #connection-load limit 500

Again, as described above, if the calculated average load is less than this limit, then the site is kept as a potential candidate.

To configure the number of sampling intervals and the sampling rate (e.g., sampling rate=5, interval=6), the following example command may be used:

SW-GSLB-Controller (config-gslb-policy) #connection-load intervals 6 5

To configure the interval weights, the following example command can be used:

SW-GSLB-Controller (config-gslb-policy) #connection-load weights 1 2 3 4 5 6

The syntax of this command is:

connection-load weights<weight of interval-1><weight of interval-2><weight of interval-3> . . . up to 8, for example.

All weights for all intervals need not be configured if not considering beyond a certain point. The configured weights will be assigned to intervals starting from the first and any non-configured interval will be assigned a weight of zero. For example, if only the 5-second average is desired, the following can be used:

SW-GSLB-Controller (config-gslb-policy) #connection-load intervals 6 5

SW-GSLB-Controller (config-gsib-policy) #connection-load weights 1

Thus, even though 6 intervals are configured in the above example, all the others are nullified due to zero weights.

By default the connection-load metric is not included in the GSLB algorithm. Once the connection-load limit is configured, the metric is included after the geographic-location metric in the metric order according to one embodiment, such as shown in FIG. 2B. It is understood that the metric order can be changed or customized.

At act 115, if there are no multiple candidates at the top of the IP list that have passed the connection-load metric (or there are none of equal rank), then the IP address list is sent to the client program 28 at act 108. After act 115, if multiple sites are of equal rank for the best site, the IP addresses can then be reordered based upon available session capacity (act 109). For example in one embodiment, if switch 18A has 1,000,000 sessions available and switch 22B has 800,000 sessions available, switch 18A is then preferred, if a tolerance limit, representing the difference in sessions available expressed as a percentage of capacity in the larger switch, is exceeded. For example, if the tolerance limit is 10%, switch 18A will have to have at a minimum 100,000 more sessions available than switch 22B to be preferred. If an IP address is preferred (act 110), the IP address will be placed at the top of the IP address list, and is then returned to the requesting entity at act 108. Otherwise, if the session capacity metric does not resolve the best IP address, then the GSLB metric applies the active bindings metric at act 122.

According to an embodiment, active bindings is a measure of the number of active real servers (e.g., the servers 26A, 26B, etc.) bound to a VIP address residing on a GSLB site (e.g., the sites 20 or 24). The active bindings metric bases its selection of the best IP address on this number of active servers and prefers a VIP with the highest number of active bindings. In effect by selecting the VIP with the highest number of active bindings, the active bindings metric allows the VIP with the largest server capacity to handle a correspondingly greater load of traffic.

An embodiment of the active bindings metric is an optional metric in the GSLB algorithm, and is disabled by default. When enabled, the active bindings metric is placed after the session capacity metric of act 102 in the GSLB algorithm. The default metric order can be changed anytime using the metric-order command (or other suitable command) at the policy configuration level. To use the active bindings metric, the user enables the metric in the GSLB policy.

As part of the GSLB protocol communications between the GSLB switch controller 401 and the remote metric agent 407 (indicated in FIG. 3 as the Foundry GSLB protocol communication between the metric collector 406 and the metric agent 407), the metric agent 407 periodically reports the information necessary for the GSLB switch controller 401 to implement the active bindings metric. This information includes, for each VIP address on the agent SI (e.g., the site switch 18A in FIG. 3), the virtual ports configured and the number of active real servers bound to the virtual port(s). The GSLB switch controller 401 processes the information from the metric agent 407 and for each VIP of interest, stores the number of active bindings for the respective application port.

If the metric agent 407 at the site switch is running a version of code that does not support the active bindings metric, the metric agent 407 of one embodiment will not report any information specific to the active bindings metric. In this case, the GSLB switch controller 401 assumes a default active bindings value of one (1) for each VIP address residing on that site, if the VIP address is active as determined by the GSLB health check metric. If the VIP address is not active or is down, the active bindings value is zero (0). The same logic applies to an IP address that is a real server. The active bindings value is either 0 or 1, depending on the health check of the real IP address.

When the active bindings metric is enabled, at the active bindings metric stage (act 122) in the GSLB algorithm, the GSLB switch controller 401 evaluates each IP address in the DNS reply from the authoritative DNS server 16, and selects the IP address with the highest value of active bindings. The number of active bindings for an IP address is defined as follows in one embodiment:

If the IP address is a VIP address residing on a remote site that supports the active bindings metric:
   $ActiveBindings_{vip}$=NumActiveRealServersBoundFor ApplicationPort$_{vip}$ If the IP address is a VIP address residing on a remote site that is running older versions of GSLB agent code and hence does not support the active-bindings metric:
   $ActiveBindings_{vip}$=1, if the VIP address has passed a health check; and
   $ActiveBindings_{vip}$=0, if the VIP address is down.

If the IP address is a real server:
   $ActiveBindings_{ip}$=1, if the real IP address is determined active by the GSLB health check mechanism; and
   $ActiveBindings_{ip}$=0, if the real IP address is down.

If all potential candidates have zero or equal value of active bindings, the active bindings metric considers all of them to be equal and passes them to be evaluated by the next stage in the GSLB algorithm at act 124. Likewise, if two or more IP addresses have the highest value of active bindings, the active bindings metric will make no selection and passes all candidates with the high value to the next stage in the GSLB algorithm at act 124.

To use the active bindings metric, the metric is enabled in the GSLB policy or algorithm. The active bindings metric can be enabled/disabled at the "gslb policy" config level of the CLI using the following example command:
   SLB-ServerIron(config-gsib-policy)# [no] active-bindings
The active bindings value for each IP address can be viewed using the CLI command "show gslb dns zone," with the example syntax shown below:
   SLB-ServerIron(config)# show gsib dns zone
If the active bindings metric at act 122 does not resolve the best VIP address, then act 111 then attempts to a resolution based upon a "flashback" speed. The flashback speed is a time required for a site switch to respond to layers 4 and 7 health checks by the GSLB switch. The flashback speed is thus a measure of the load on the host server. Again, the preferred IP address will correspond to a flashback speed exceeding the next one by a preset tolerance limit.

In one embodiment, flashback speeds are measured for well-known applications (layer 7) and their corresponding TCP ports (layer 4). For other applications, flashback speeds are measured for user selected TCP ports. Layer 7 (application-level) flashback speeds are compared first, if applicable. If the application flashbacks fail to provide a best IP address, layer 4 flashback speeds are compared. If a host server is associated with multiple applications, the GSLB switch selects the slowest response time among the applications for the comparison. At act 112, if a best IP address is resolved, the IP address list is sent to client program 28 at act 108. Otherwise, at act 113, an IP address in the site that is least often selected to be the "best" site is chosen. The IP address list is then sent to client program 28 (act 108).

Upon receipt of the IP address list, the client program 28 uses the best IP address selected (i.e., the top of the list) to establish a TCP connection with a host server. Even then, if there is a sudden traffic surge that causes a host server to be overloaded, or if the host servers or the applications at the site become unavailable in the mean time, the site switch can redirect the TCP connection request to another IP address using, for example, an existing HTTP redirection procedure.

To provide an RTT under an embodiment of the present invention described above, at the first time a client accesses an IP address, a site switch (e.g., site switch 22A of FIG. 2) monitors the RTT time—the time difference between receiving a TCP SYN and a TCP ACK for the TCP connection—and records it in an entry of the cache database. The RTT time measured this way corresponds to the natural traffic flow between the client machine and the host server specified, rather than an artificial RTT based on "pinging" the client machine under a standard network protocol. Periodically, the site switches report the RTT database to a GSLB switch along with load conditions (e.g., number of sessions available). The GSLB switch aggregates the RTTs reported into a proximity table indexed by network neighborhood. (A network neighborhood is the portion of a network sharing a prefix of an IP address.) The GSLB switch can thus look up the RTT for a client machine to any specific host server, based on the client's network neighborhood specified in the client's IP address. From the accesses to the host servers from a large number of network neighborhoods, the GSLB switch can build a comprehensive proximity knowledge database that enables smarter site selection. In order to keep the proximity table useful and up-to-date, the GSLB switch manages the proximity table with cache management policies (e.g., purging infrequently used entries in favor of recently obtained RTTs). The proximity data can be used for all IP addresses served by each site switch.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention and can be made without deviating from the spirit and scope of the invention.

For example, while various configuration commands or other software commands are explained above using a certain specific syntax, it is appreciated that this syntax is merely illustrative. Other types of commands, operations, or syntax can be used to perform the desired operations and settings.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method of providing load balancing among host servers, the method comprising:
    determining a number of active host servers bound to each of a plurality of virtual addresses respectively residing at each of a plurality of site switches; and
    arranging said virtual addresses as an ordered list by selecting one of said virtual address having a greatest said determined number of active host servers bound to it as a candidate optimum virtual address in said ordered list.

2. The method of claim 1, further comprising:
    assigning a weight to at least one of said site switches, the assigned site weight being indicative of an amount of traffic that the site is to receive relative to at least another site corresponding to another of said site switches; and
    alternatively assigning a weight to at least one of the virtual addresses, the assigned address weight being indicative of an amount of traffic that the virtual address is to receive relative to at least another virtual address.

3. The method of claim 2 wherein arranging the virtual addresses as the ordered list includes further arranging the virtual addresses based at least in part on consideration of the assigned site weight or the assigned address weight, including arranging the ordered list based on selection of one of a virtual address that has a least relative weight as said candidate optimum virtual address.

4. The method of claim 2, further comprising:
    computing a relative weight for each virtual address, wherein said arranging the virtual addresses as the ordered list further includes arranging based at least in part on consideration of the assigned site weight or the assigned address weight to select one of the virtual addresses that has a least relative weight; and
    if the computed relative weight of all of said virtual addresses is equal to a maximum relative weight, passing the list of virtual addresses, without arranging them, to a next stage to allow arrangement of the list of virtual addresses at the next stage based on a different metric.

5. The method of claim 4 wherein computing the relative weight for each virtual address includes computing for a particular one of said virtual addresses its relative weight according to a number of times that said particular virtual address was previously selected as an optimum virtual address, multiplied by a sum of assigned weights of the virtual addresses, divided by the assigned weight to said particular virtual address.

6. The method of claim 1 wherein the number of active host servers bound to a particular one of the virtual addresses is set at 1 if a site associated with the particular virtual address does not support a metric indicative of the number of active host servers bound to the particular virtual address and is set at 0 if said particular virtual address is down.

7. A method, comprising:
    determining a number of active host servers bound to each of a plurality of virtual addresses;
    receiving a list of virtual addresses; and
    arranging the virtual addresses in the list of virtual addresses to identify at least one virtual address, having a highest said determined number of active host servers bound to it, from the list as a candidate optimum virtual address to receive traffic.

8. The method of claim 7, further comprising also arranging the virtual addresses in said list based at least in part on a weight assigned to at least one site or based at least in part on a weight assigned to one of the virtual addresses, the assigned weights being respectively indicative of an amount of traffic that is to be received by the site or virtual address relative to other sites or virtual addresses.

9. The method of claim 8, further comprising selecting a virtual address having a least relative weight, which is derived from one of the assigned weights, as said candidate for the optimum virtual address.

10. An article of manufacture, comprising:
    a storage medium having instructions stored thereon that are executable by a processor to:

determine a number of active servers that are bound to each of a plurality of virtual addresses; and arrange a list of virtual address to identify a virtual address having a determined most number of active servers bound to it as a candidate optimum virtual address to receive traffic.

11. The article of manufacture of claim 10 wherein the storage medium further includes instructions stored thereon and executable by said processor to:

calculate a relative weight that is based at least in part on assigned weights for a plurality of virtual addresses or for a plurality of sites;

select a virtual address on the list that has a least said calculated relative weight as said candidate for the optimum virtual address; and pass the list of virtual addresses without arrangement thereof, to determine said virtual address having said most number of active servers bound to it, if the calculated relative weight of all of said virtual addresses is equal to a maximum relative weight.

12. A load balancing system, comprising:

a means for determining a number of active servers that are bound to each of a plurality of virtual addresses; and a means for arranging a list of virtual addresses by selecting one of said virtual addresses that has a greatest determined number of active host servers bound to it as a candidate optimum virtual address to receive traffic.

13. The system of claim 12 wherein weights are assigned to a plurality of sites or to a plurality of virtual addresses.

14. The system of claim 13, further comprising a means for calculating a relative weight for each of said virtual addresses, the relative weight of a particular one of said virtual addresses being calculated according to a sum of the assigned weights of said virtual addresses and on a count of times that said particular virtual address was previously selected as an optimum virtual address and the assigned weight of said particular virtual address.

15. An apparatus to balance load among host servers, the apparatus comprising:

a load balance switch having a controller to arrange a list of virtual addresses to identify an optimum virtual address from the list of virtual addresses, wherein a number of active ones of the host servers are bound to each of said virtual addresses, the controller being adapted to identify as a candidate for the optimum virtual address one of said virtual addresses having a largest said number of active ones of the host servers bound to it.

16. The apparatus of claim 15 wherein said controller is further adapted to identify said candidate optimum virtual address using an assigned weight indicative of an amount of traffic to be received by a site relative to another site.

17. The apparatus of claim 15 wherein said controller is further adapted to identify said candidate optimum virtual address using an assigned weight indicative of an amount of traffic to be received by a virtual address relative to another virtual address.

18. The apparatus of claim 17 wherein the controller is adapted to calculate a relative weight based on the assigned weight and based on a count of times that a particular virtual address was previously selected as the optimum virtual address, wherein the controller is adapted to identify a virtual address having a least relative weight as said candidate for the optimum virtual address.

19. The apparatus of claim 15 wherein the controller is responsive to commands that specify at least one of enable a metric usable with a weight, disable the metric usable with the weight, a weight to be assigned for a site, a weight to be assigned for a virtual address, change an order in which metrics are to be applied, enable determination of the number of bound host servers, and disable determination of the number of bound host servers.

20. A site switch apparatus comprising:

at least one port configurable to have at least one host server bound thereto, wherein each of said at least one port is configurable to be respectively associated with an individual one of a plurality of virtual addresses; and a metric agent configurable to communicate, to a load balance switch, a number of active ones of said at least one host server bound to said at least one port, the number of active ones of said at least one host server being usable by the load balance switch to arrange a list of network addresses, by selection as an optimum address one of said virtual addresses from said list of network addresses that has a largest said number of active ones of said host servers bound to that virtual address' associated port.

21. An apparatus to balance load among host servers, the apparatus comprising:

a load balance switch having:

a storage medium having instructions stored thereon; and a controller coupled to said storage medium and adapted execute said instructions stored on said storage medium to arrange a list of virtual addresses to identify a particular one of said virtual addresses from the list of virtual addresses as a candidate optimum virtual address to receive traffic based at least in part on a computed relative weight associated with each virtual address, said particular virtual address having a computed least relative weight as compared to computed relative weights of other ones of said virtual addresses in said list, wherein said relative weight of said particular virtual address is computed by said controller based on assigned weights of all of said virtual addresses, on a count of times that said particular virtual address was previously selected as the optimum virtual address, and on the assigned weight of said particular virtual address.

22. The apparatus of claim 21 wherein said controller is adapted to compute said relative weight of said particular virtual address by summing assigned weights of all of said virtual addresses, multiplying said summed assigned weights by said count of times that said particular virtual address was previously selected as an optimum virtual address, and dividing by the assigned weight of said particular virtual address.

23. The apparatus of claim 22 wherein the assigned weight of said particular virtual address is based on a weight of a site to which said particular virtual address belongs, divided by a number of candidate virtual addresses belonging to said site.

24. The apparatus of claim 21 wherein if computed relative weights of all of said virtual addresses are equal, said controller is adapted to arrange said list of virtual addresses by identifying as said candidate optimum virtual address a virtual address having a greatest number of active host servers bound to it as compared to a number of active host servers bound to other ones of said virtual addresses.

25. A method of providing load balancing among host servers, the method comprising:

for each of a plurality of virtual addresses respectively residing at each of a plurality of site switches, determining a relative weight based on a weight assigned to at least one of the virtual addresses, the assigned weight being indicative of an amount of traffic that the virtual address is to receive relative to at least another virtual address; and arranging the virtual addresses as an ordered list by selecting one of said virtual addresses that has a least said determined relative weight as a candidate optimum virtual address.

26. The method of claim 25, further comprising:

determining a number of active host servers bound to each of said plurality of virtual addresses; and further arranging said virtual addresses as said ordered list by selecting one of said virtual address having a greatest determined number of active host servers bound to it as said candidate optimum virtual address.

27. The method of claim 25, wherein said determining the relative weight includes:

computing for a particular one of said virtual addresses its relative weight according to a number of times that said particular virtual address was previously selected by the load balance switch as said preferred virtual address, multiplied by a sum of assigned weights of the virtual addresses, divided by the assigned weight to said particular virtual address.

28. An apparatus to balance load among host servers, the apparatus comprising:

a load balance switch having a controller to arrange a list of network addresses to identify a candidate optimum network address from the list of network addresses based at least in part on a respective weight indicative of an amount of traffic to be received by each of said network addresses of said list, wherein said controller is adapted to calculate a relative weight for each network address based on the respective weight of each network address and based on a count of times that each respective network address was previously selected as an optimum network address, and wherein said controller is adapted to identify one of said network addresses having a calculated least relative weight as said candidate optimum network address.

29. The apparatus of claim 28 wherein to calculate the relative weight of each respective network address, said controller is adapted to multiply said count by a sum of respective weights of the network addresses, divided by the respective weight of said respective network address.

30. The apparatus of claim 28 wherein said controller is further adapted to determine a number of active host servers bound to each of said network addresses, and further adapted to arrange said list by selection of a particular one of said network addresses having a greatest determined number of active host servers bound to it as said candidate optimum network address.

* * * * *

UNITED STATES PATENT AND TRADEMARK OFFICE
CERTIFICATE OF CORRECTION

PATENT NO.        : 7,657,629 B1
APPLICATION NO. : 10/376903
DATED             : February 2, 2010
INVENTOR(S)       : Sunanda L. Kommula It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 872 days.

Signed and Sealed this

Thirtieth Day of November, 2010

David J. Kappos
*Director of the United States Patent and Trademark Office*

EX PARTE REEXAMINATION CERTIFICATE (9571st)
United States Patent
Kommula

(10) Number: US 7,657,629 C1
(45) Certificate Issued: Mar. 22, 2013

(54) GLOBAL SERVER LOAD BALANCING

(75) Inventor: Sunanda L. Kommula, San Jose, CA (US)

(73) Assignee: Brocade Communications Systems, Inc., San Jose, CA (US)

Reexamination Request:
No. 90/011,766, Jun. 27, 2011

Reexamination Certificate for:
Patent No.: 7,657,629
Issued: Feb. 2, 2010
Appl. No.: 10/376,903
Filed: Feb. 28, 2003

Certificate of Correction issued Nov. 30, 2010.

Related U.S. Application Data

(63) Continuation-in-part of application No. 10/206,580, filed on Jul. 25, 2002, now Pat. No. 7,254,626, which is a continuation-in-part of application No. 09/670, 487, filed on Sep. 26, 2000, now Pat. No. 7,454,500.

(51) Int. Cl.
*G06F 15/173* (2006.01)

(52) U.S. Cl.
USPC ........... 709/226; 709/223; 709/224; 709/227; 709/228; 709/241; 709/201

(58) Field of Classification Search .................. None
See application file for complete search history.

(56) References Cited

To view the complete listing of prior art documents cited during the proceeding for Reexamination Control Number 90/011,766, please refer to the USPTO's public Patent Application Information Retrieval (PAIR) system under the Display References tab.

*Primary Examiner* — Mary Steelman

(57) ABSTRACT

A global server load-balancing (GSLB) switch serves as a proxy to an authoritative DNS and communicates with numerous site switches that are coupled to host servers serving specific applications. The GSLB switch receives from site switches operational information regarding host servers within the site switches neighborhood. When a client program requests a resolution of a host name, the GSLB switch, acting as a proxy of an authoritative DNS, returns one or more ordered IP addresses for the host name. The IP addresses are ordered using metrics that include the information collected from the site switches or based on other metric information. Examples of metrics include weighted site, weighted IP, and active bindings metrics. The GSLB switch places the address that is deemed "best" at the top of the list.

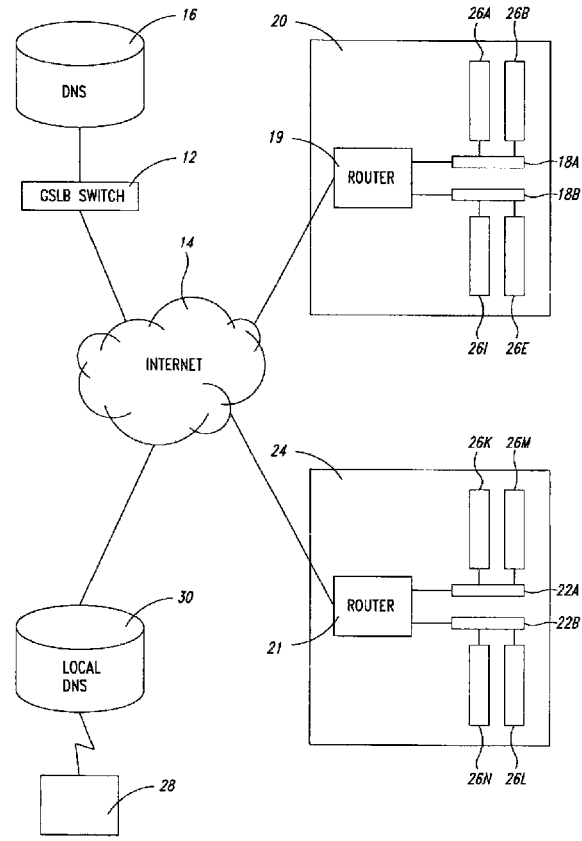

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1, 7, 8, 10, 15 and 19 is confirmed.

Claims 2-6, 9, 11-14, 16-18 and 20-30 were not reexamined.

* * * * *

(12) INTER PARTES REEXAMINATION CERTIFICATE (763rd)
United States Patent
Kommula

(10) Number: US 7,657,629 C2
(45) Certificate Issued: Dec. 10, 2013

(54) GLOBAL SERVER LOAD BALANCING

(75) Inventor: Sunanda L. Kommula, San Jose, CA (US)

(73) Assignee: Brocade Communications Systems, Inc., San Jose, CA (US)

Reexamination Request:
No. 95/001,824, Nov. 17, 2011

Reexamination Certificate for:
Patent No.: 7,657,629
Issued: Feb. 2, 2010
Appl. No.: 10/376,903
Filed: Feb. 28, 2003

Reexamination Certificate C1 7,657,629 issued Mar. 22, 2013

Certificate of Correction issued Nov. 30, 2010

Related U.S. Application Data

(63) Continuation-in-part of application No. 10/206,580, filed on Jul. 25, 2002, now Pat. No. 7,254,626, which is a continuation-in-part of application No. 09/670,487, filed on Sep. 26, 2000, now Pat. No. 7,454,500.

(51) Int. Cl.
*G06F 15/173* (2006.01)

(52) U.S. Cl.
USPC .......... 709/226; 709/223; 709/224; 709/227; 709/228; 709/241; 709/201; 709/203

(58) Field of Classification Search
None
See application file for complete search history.

(56) References Cited

To view the complete listing of prior art documents cited during the proceeding for Reexamination Control Number 95/001,824, please refer to the USPTO's public Patent Application Information Retrieval (PAIR) system under the Display References tab.

*Primary Examiner* — Mary Steelman

(57) ABSTRACT

A global server load-balancing (GSLB) switch serves as a proxy to an authoritative DNS and communicates with numerous site switches that are coupled to host servers serving specific applications. The GSLB switch receives from site switches operational information regarding host servers within the site switches neighborhood. When a client program requests a resolution of a host name, the GSLB switch, acting as a proxy of an authoritative DNS, returns one or more ordered IP addresses for the host name. The IP addresses are ordered using metrics that include the information collected from the site switches or based on other metric information. Examples of metrics include weighted site, weighted IP, and active bindings metrics. The GSLB switch places the address that is deemed "best" at the top of the list.

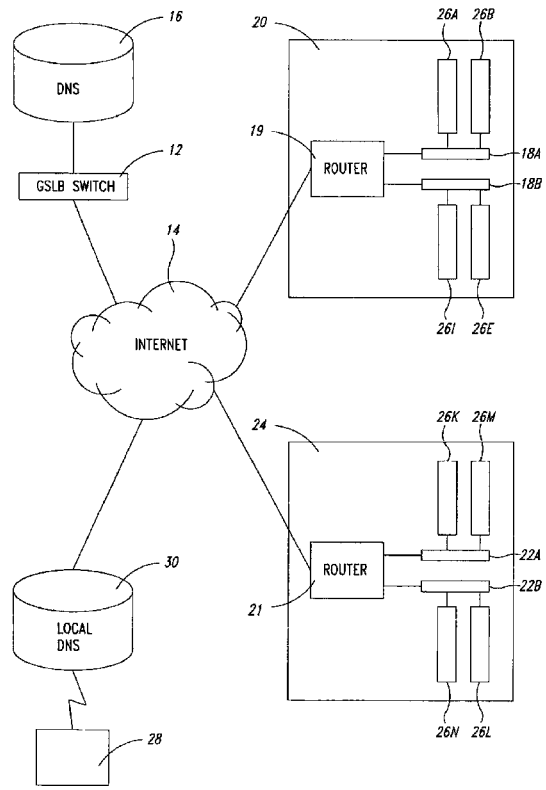

INTER PARTES REEXAMINATION CERTIFICATE ISSUED UNDER 35 U.S.C. 316

NO AMENDMENTS HAVE BEEN MADE TO THE PATENT

AS A RESULT OF REEXAMINATION, IT HAS BEEN DETERMINED THAT:

The patentability of claims 1, 2, 7, 8, 10, 12, 13, 15-17, 19 and 20 is confirmed.

Claims 3-6, 9, 11, 14, 18 and 21-30 were not reexamined.

* * * * *